(12) United States Patent
Wilde et al.

(10) Patent No.: US 6,246,657 B1
(45) Date of Patent: Jun. 12, 2001

(54) FIBER BUNDLE SWITCH

(75) Inventors: Jeffrey P. Wilde, Los Gatos; John F. Heanue, San Jose; Jerry E. Hurst, Jr., San Jose; Stephen J. Hrinya, San Jose; Yonglin Huang, San Jose, all of CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/061,597

(22) Filed: Apr. 16, 1998

Related U.S. Application Data

(60) Provisional application No. 60/059,456, filed on Sep. 22, 1997.

(51) Int. Cl.[7] .................................................. G11B 7/135
(52) U.S. Cl. ................................. 369/112.09; 369/44.14
(58) Field of Search ............................. 369/44.14, 44.15, 369/44.17, 44.18, 44.19, 44.37, 112, 116, 103, 119; 359/833, 850, 851

(56) References Cited

U.S. PATENT DOCUMENTS

| | | | |
|---|---|---|---|
| 4,239,330 | 12/1980 | Ashkin et al. | 350/96.18 |
| 4,265,513 | 5/1981 | Matsushita et al. | 350/96.2 |
| 4,304,460 | 12/1981 | Tanaka et al. | 350/96.16 |
| 4,498,730 | 2/1985 | Tanaka et al. | 350/96.16 |
| 4,626,066 | 12/1986 | Levinson | 350/96.18 |
| 4,838,631 | 6/1989 | Chande et al. | 350/6.6 |
| 4,896,937 | 1/1990 | Kraetsch et al. | 350/96.2 |
| 4,978,190 | 12/1990 | Veith | 350/96.18 |
| 5,000,532 | 3/1991 | Kraetsch et al. | 350/96.2 |
| 5,024,500 | 6/1991 | Stanley et al. | 350/96.15 |
| 5,208,880 | 5/1993 | Riza et al. | 385/18 |
| 5,260,928 | 11/1993 | Lee et al. | 369/112 |
| 5,446,811 | 8/1995 | Field et al. | 385/23 |
| 5,452,283 | 9/1995 | Lee et al. | 369/112 |
| 5,493,440 | 2/1996 | Souda et al. | 359/341 |
| 5,532,884 | 7/1996 | Lee et al. | 359/833 |
| 5,647,033 | 7/1997 | Laughlin | 385/16 |

FOREIGN PATENT DOCUMENTS

| | | |
|---|---|---|
| 295 17 012 U1 U | 2/1996 | (DE) . |
| 2 178 869 | 2/1987 | (GB) . |
| 6310402 | 4/1994 | (JP) . |
| WO 92/07356 | 4/1992 | (WO) . |

OTHER PUBLICATIONS

"Micromachined 1×2 Optical Fiber Switch", L. Field, D. Burriesci, P. Robrish, R. Ruby, *Transducers '95*, Jun.25–29, 1995, pp. 344–347.

Article by M. Edward Motamedi, Ming C. Wu and Kristofer S.J. Pister entitled "Micro–opto–electro–mechanical devices and on–chip optical processing," May 1997, pp. 1282–1297.

*Primary Examiner*—Muhammad Edun
(74) *Attorney, Agent, or Firm*—Flehr Hohbach Test Albritton & Herbert LLP

(57) ABSTRACT

An actuator assembly directs a first beam of light towards an optical assembly. A particular angular displacement of the beam of light relative to the optical assembly by the actuator assembly directs the beam of light to exit the optical assembly at a particular output port.

26 Claims, 12 Drawing Sheets

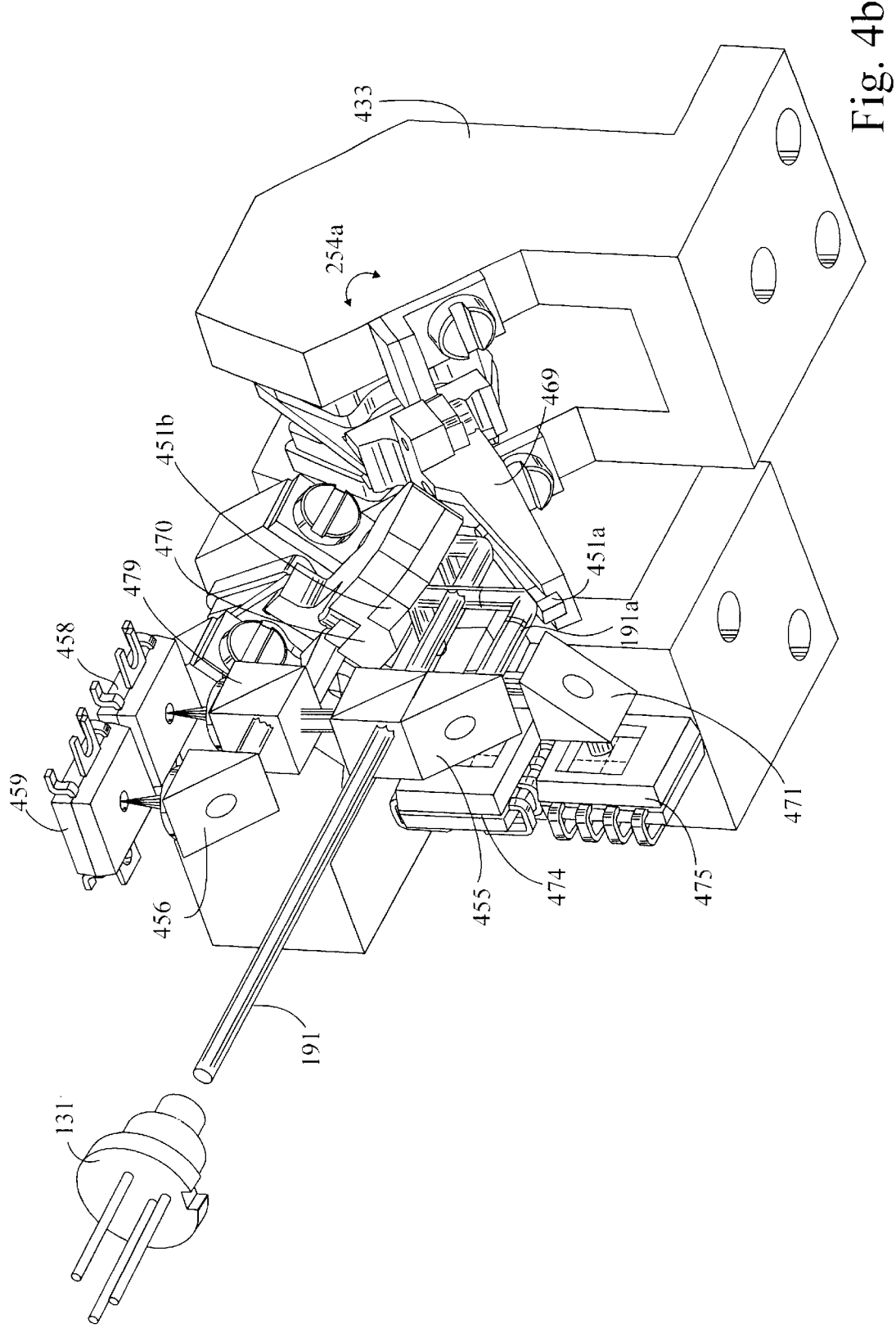

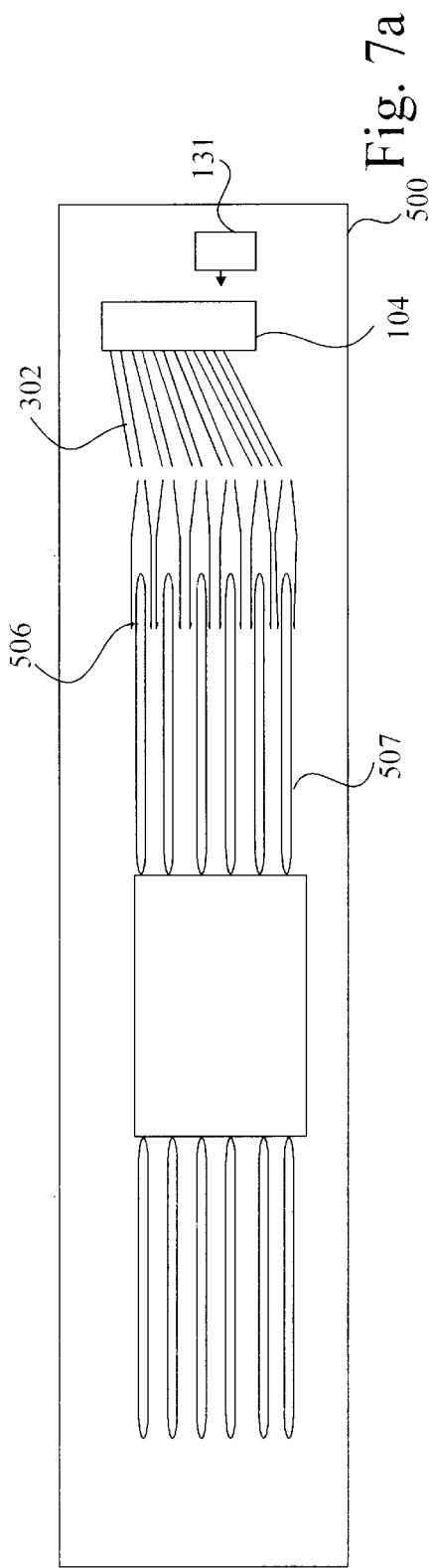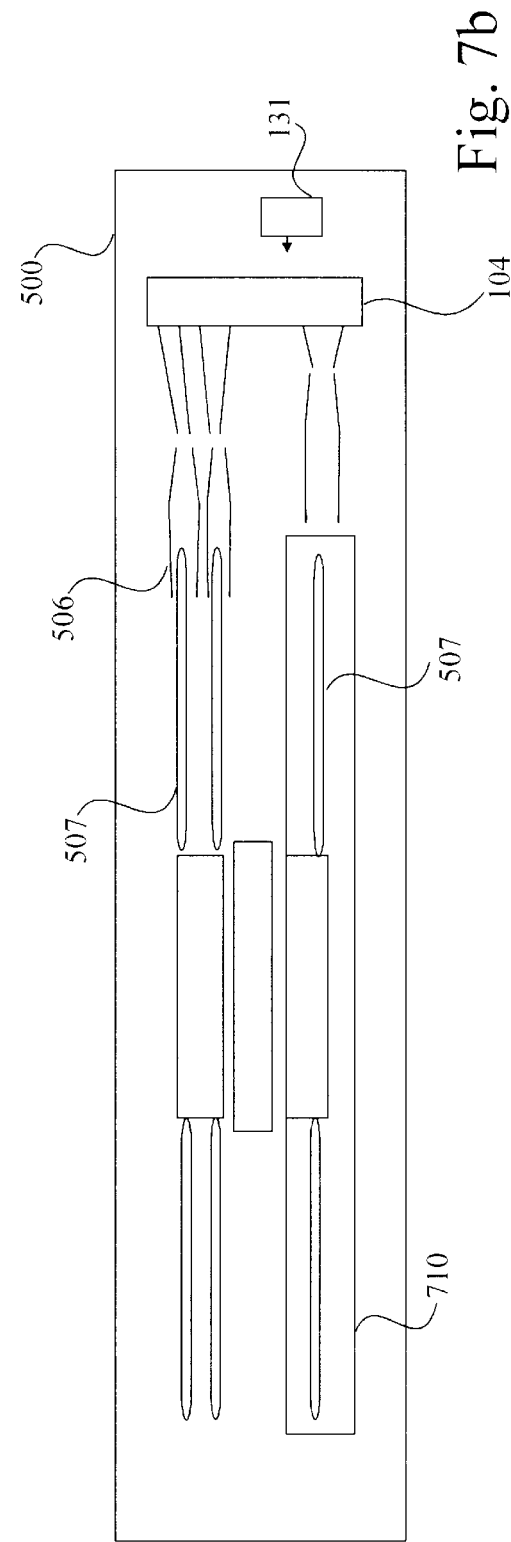

FIBER BUNDLE SWITCH

RELATED APPLICATIONS

This application is related to and claims priority from commonly assigned U.S. Provisional Application 60/059,456 filed, on Sep. 9, 1997 and is incorporated herein by reference.

FIELD OF THE INVENTION

The present invention relates generally to the optical switching of light, and more particularly to the optical switching of light in an optical data storage and retrieval system.

BACKGROUND ART

A number of optical switch technologies are currently used for controlling the optical passage of light. With one technology, electric current is applied to a polymer to create a thermal effect that changes a refractive index of a polymer. As the refractive index changes, a light beam passing through the polymer is selectively routed from an input to an output. Although faster than a comparable mechanical optical switch, the switching time of polymer optical switches is limited significantly by the thermal characteristics of the polymer. Additionally, the optical properties of the light transmitted through the polymer are undesirably affected by the optical characteristics of the polymer.

Another optical switch is disclosed by Leslie A. Field et al., in "The 8$^{th}$ International Conference on Solid-State Sensors and Actuators, and Eurosensors IX, Stockholm, Sweden, Jun. 25–29, 1995." The optical switch is micromachined in silicon and uses a thermally activated actuator to mechanically move a single send optical fiber relative to two receive optical fibers. Field et al. exhibits relatively slow mechanical movement due to inherent thermal effects. Additionally, Field et al. provides only one degree of optical alignment, resulting in inefficient transfer between optical fibers due to slight misalignments.

Another micro-machined optical switch is disclosed by Levinson in U.S. Pat. No. 4,626,066. Levinson uses a cantilevered micro-machined mirror that is electrostatically positioned between a stopped and unstopped position. While Levinson's mirror may deflect light between two optical fibers, as with the aforementioned switch designs, it also is capable of optical alignment in only one dimension.

What is needed is an optical switch that provides fast and precise switching of light between an input and a plurality of outputs, or vice versa.

SUMMARY OF THE INVENTION

The present invention permits fast and precise optical switching of light between an input port and a large number of output ports in a volumetric space that is very compact.

The present invention directs a first beam of light along an optical path between an input and an output. The present invention includes an optical assembly comprising a front surface, a back surface, and an optical axis disposed between the front surface and the back surface;

The present invention further includes an actuator assembly. The actuator assembly selectively directs the first beam of light between the front surface and the actuator assembly with a selected angular orientation relative to the optical axis. The optical assembly directs the first beam of light between the front surface and the back surface. The back surface comprises a plurality of output locations, and individual ones of the plurality of output locations correspond to individual ones of the plurality of angular orientations.

The present invention further comprises a plurality of optical fibers. The plurality of optical fibers each comprise a proximal end and a distal end. The proximal ends of the optical fibers are aligned in the optical path to direct the first beam of light between a particular one of the plurality of output locations and a particular one of the distal ends. In one embodiment, the proximal ends are disposed within a housing. In another embodiment, the proximal ends are disposed in a closely packed pattern. In one embodiment, the optical assembly comprises a GRIN lens.

In the present invention, the actuator assembly comprises a first actuator and a second actuator. The first actuator comprises a first arm and a first reflector coupled to the first arm. The first reflector reflects the first beam of light at a first reflection point and the first arm rotates about a first rotation axis. The second actuator comprises a second arm and a second reflector coupled to the second arm. The second reflector reflects the first beam of light at a second reflection point and the second arm rotates about a second rotation axis. In one embodiment, the first and second actuators comprise voice coil motors. The first rotation axis falls along a horizontal plane passing a vertical distance above the point of reflection of the beam of light from the second reflector. The vertical distance is defined by approximately a distance from the reflection point of the first beam of light from the second reflector to the front surface of the optical assembly. The second rotation axis falls along a vertical plane approximately coextensive with the front surface of the optical assembly. The second reflection point is disposed along the optical path between the first reflection point and the front surface of the optical assembly. A portion of the first beam of light is directed towards a beam splitting element to exit the beam splitting element as a second beam of light. The present invention further comprises a detector. An optical position of the second beam of light is detected the detector, and the actuator assembly directs the first beam of light based on the optical position of the second beam of light. The first reflector reflects the second beam of light at a third reflection point and the second reflector reflects the second beam of light at a fourth reflection point. The optical position of the second beam is detected by the detector after the second beam is reflected from the third and fourth reflection points.

The present invention may be used in an optical disk drive to selectively direct the first beam of light towards a particular storage location.

BRIEF DESCRIPTION OF THE DRAWINGS

FIGS. 4a–4d illustrate the actuator assembly in further detail;

FIG. 7a illustrates an embodiment of a magneto-optical disk drive; and

FIG. 7b illustrates another embodiment of the magneto-optical disk drive.

DETAILED DESCRIPTION OF THE INVENTION

Figure 1:
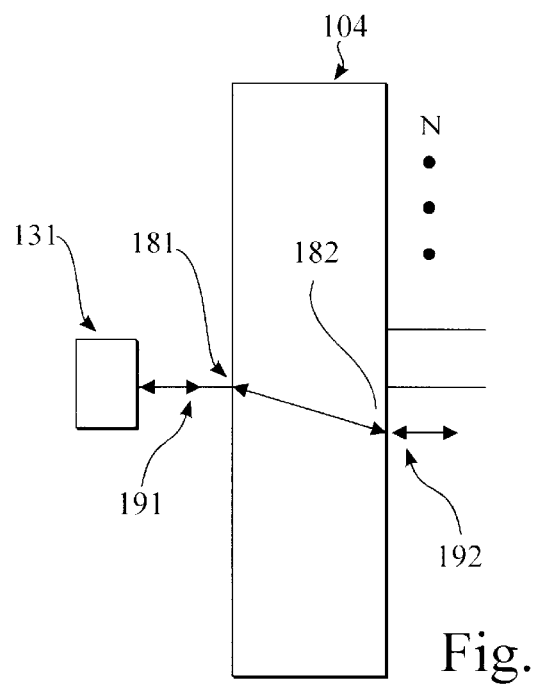
FIG. 1 is a block diagram of an optical switch of the present invention.

Referring in detail to the drawings wherein similar parts of the invention are identified by like reference numerals, there is seen in FIG. 1 a block diagram of an optical switch 104 of the present invention. The optical switch 104 includes an input port 181 and N output ports 182. In a preferred embodiment, an outgoing laser beam 191 from a laser source 131 is directed towards the input port 181. The outgoing laser beam 191 is routed by the optical switch 104 towards one of the N output ports 182. Alternatively, the optical switch 104 routes a reflected laser beam 192 (described below) from a particular one of the N output ports 182 towards the input port 181. In an exemplary embodiment N equals 19; however, it is understood that other values for N are within the scope of the present invention.

Figure 2A:
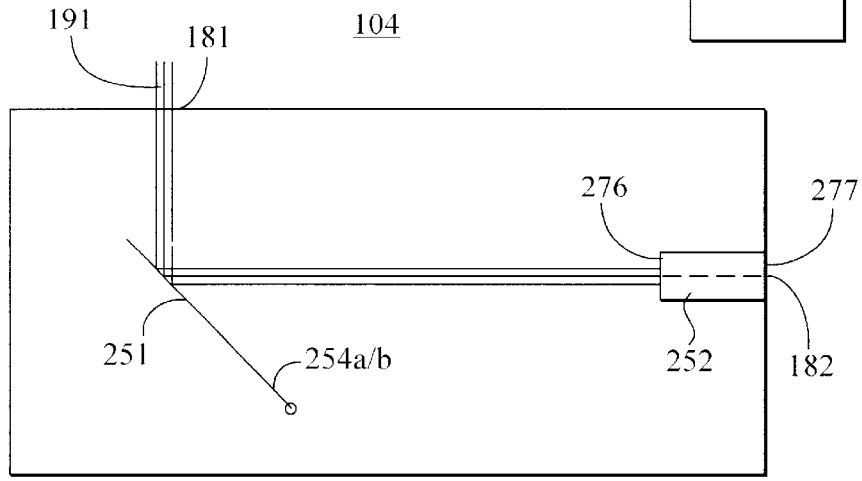
FIG. 2a and FIG. 2b are diagrams showing an outgoing laser beam displaced by an actuator assembly.
Figure 2B:
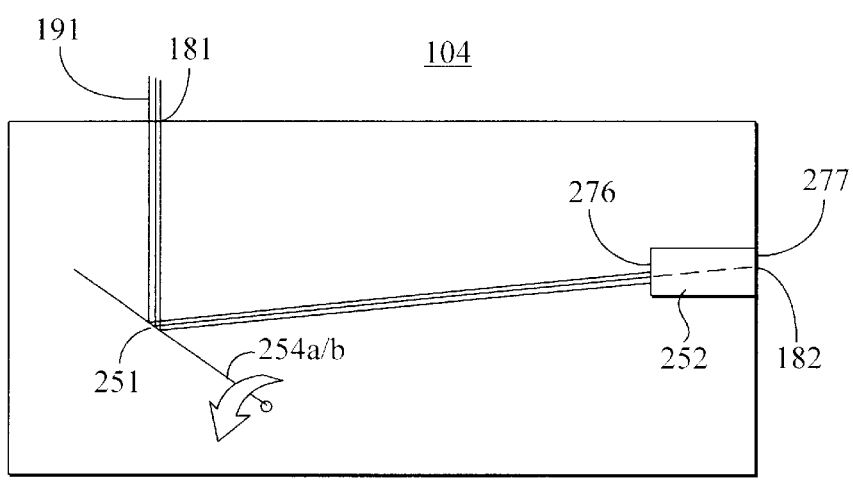

Referring now to FIG. 2a and FIG. 2b, there is seen a displacement of the outgoing laser beam by an actuator assembly. In the preferred embodiment, the optical switch 104 includes an actuator assembly 251 and a focusing assembly 252. The laser source 131 transmits the outgoing laser beam 191 towards the actuator assembly 251. The outgoing laser beam 191 is displaced by a rotational movement of the actuator assembly 251 about axes 254a and/or 254b (only one shown) so as to be incident onto approximately the same central location of a front surface 276 of the focusing assembly 252 and (depending on the rotational state of the actuator assembly 251) with a particular angular orientation relative to a central optical axis of the focusing assembly 252.

Figure 3A:
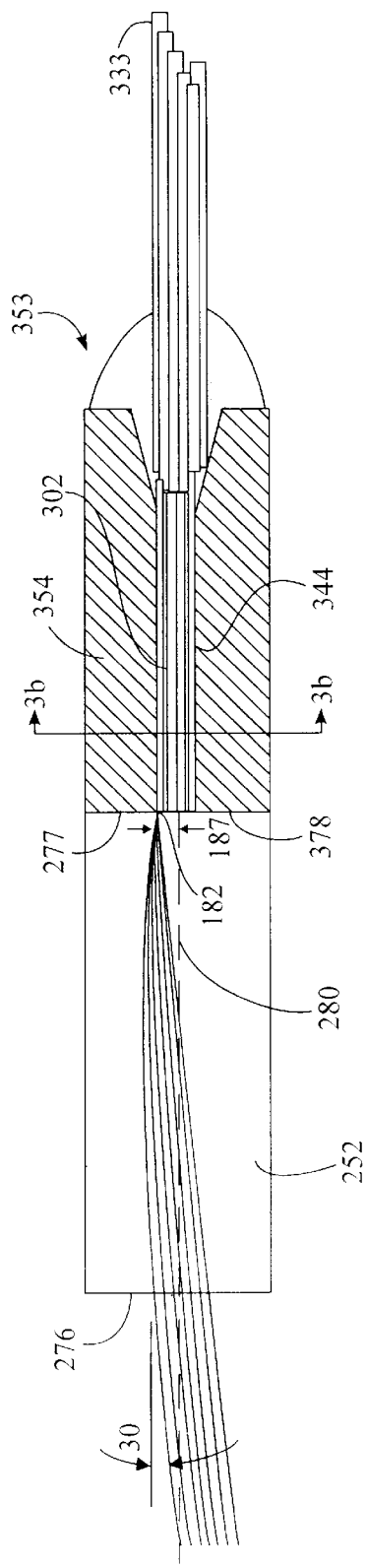
FIG. 3a illustrates a optical direction assembly coupled to an optical fiber bundle assembly.
Figure 3B:
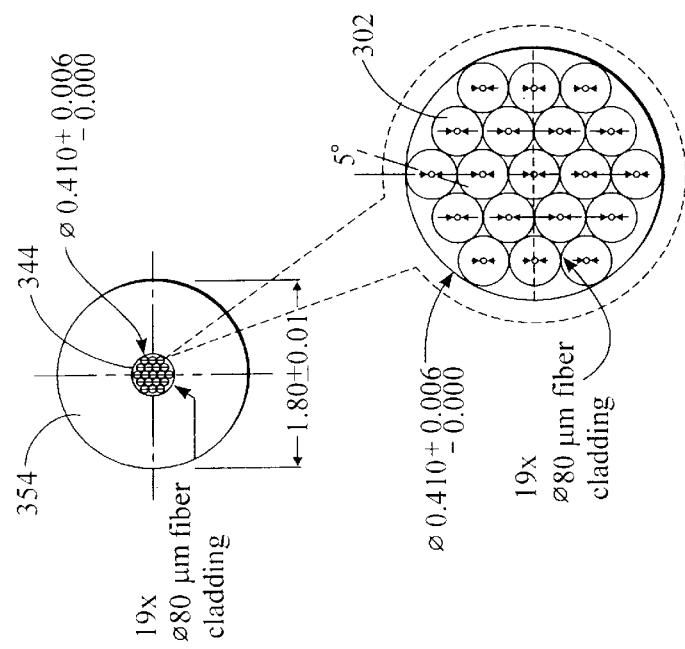
FIG. 3b illustrates a cross-section of an optical fiber bundle.
Figure 3C:
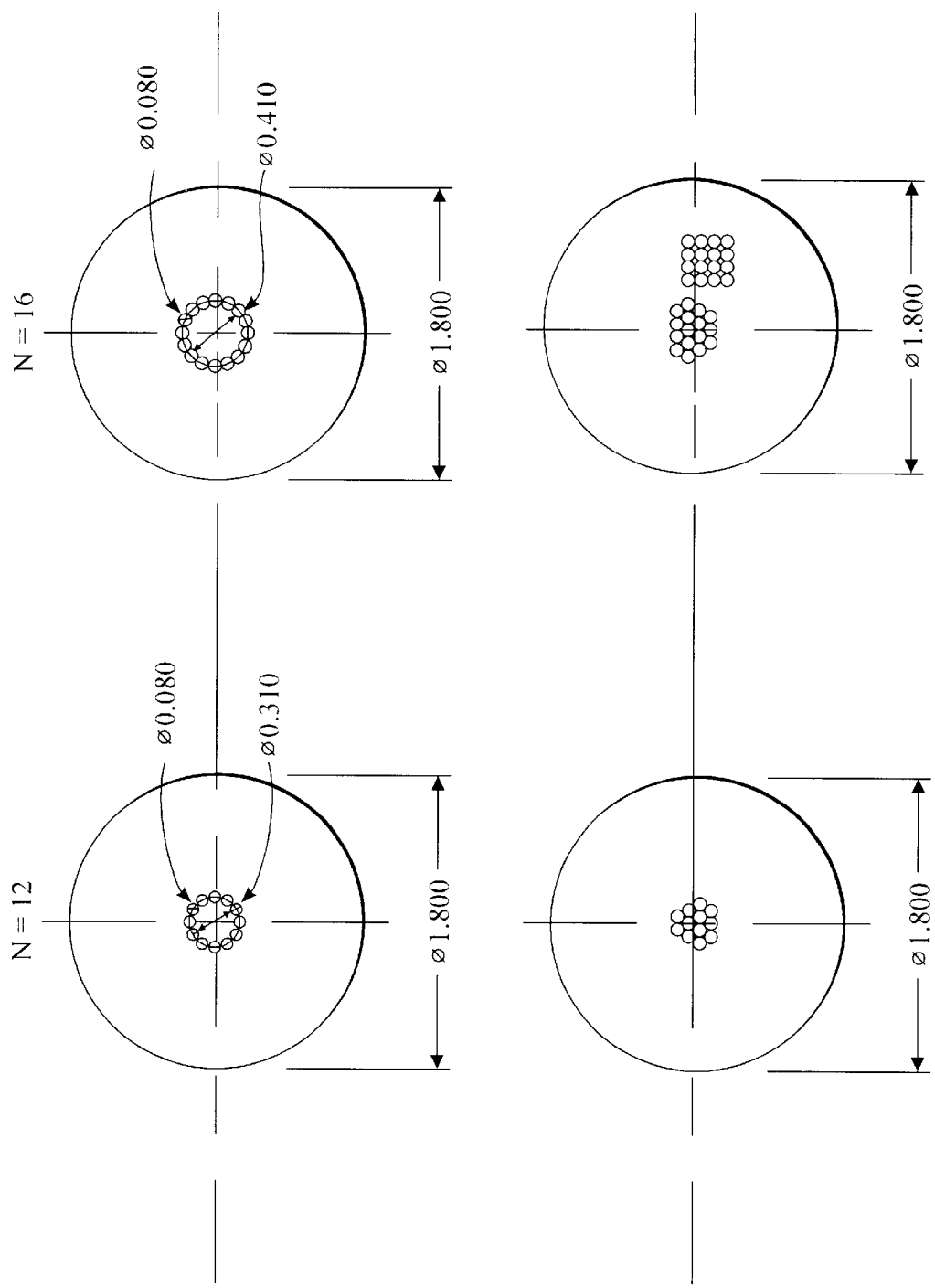
FIG. 3c illustrates alternative embodiments of the optical fiber bundle.
Figure 4A:
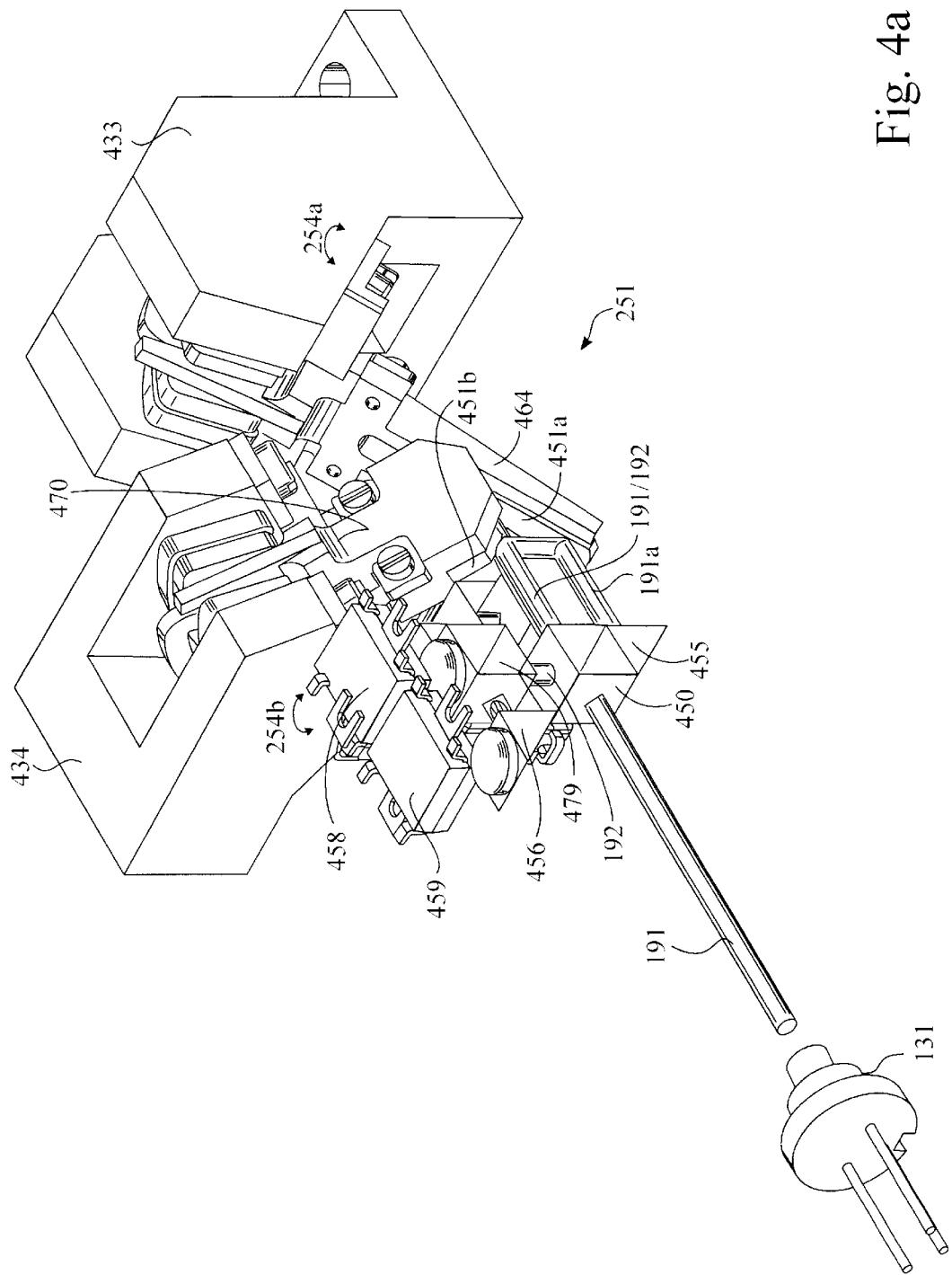
Figure 4C:
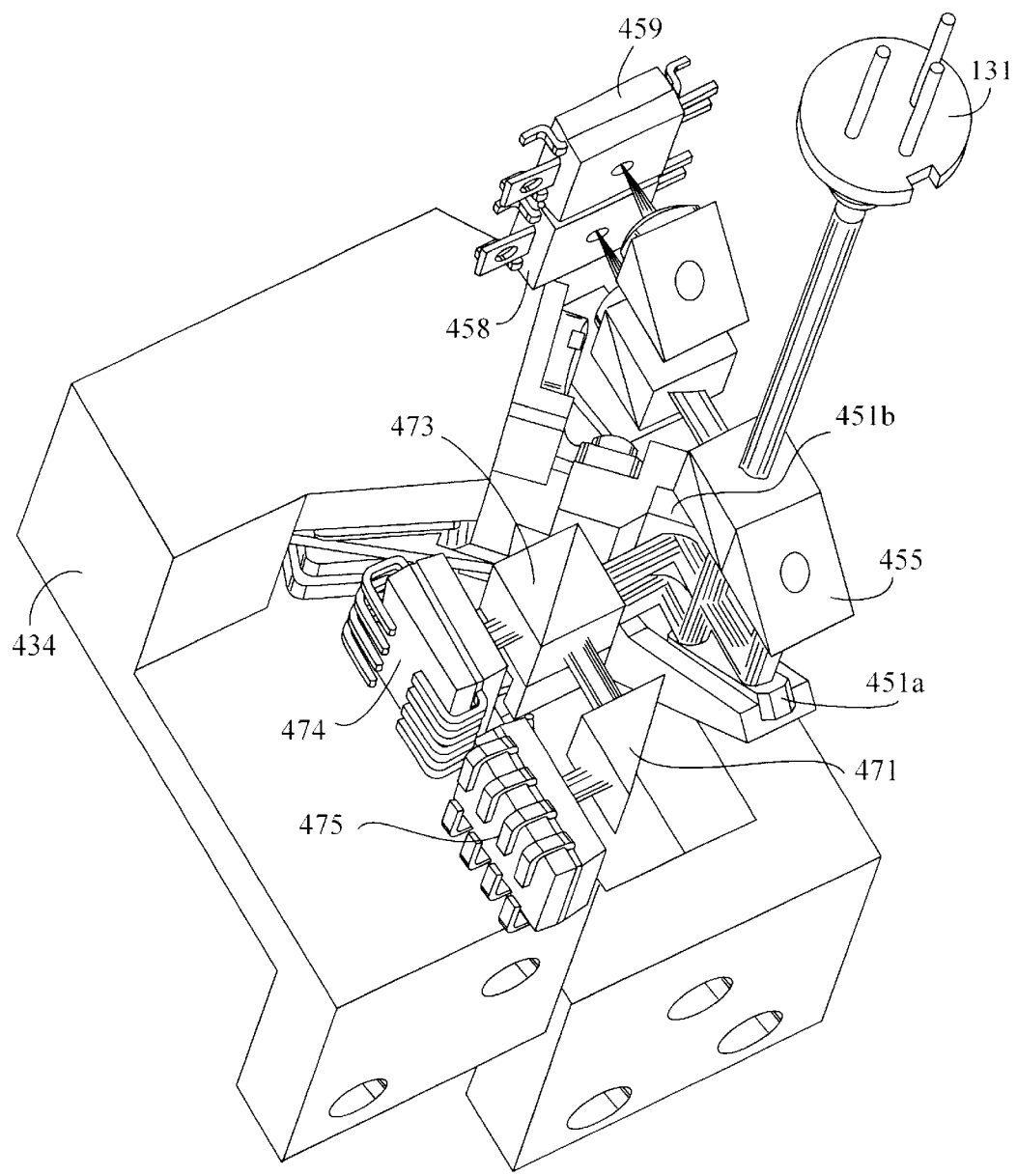
Figure 4D:
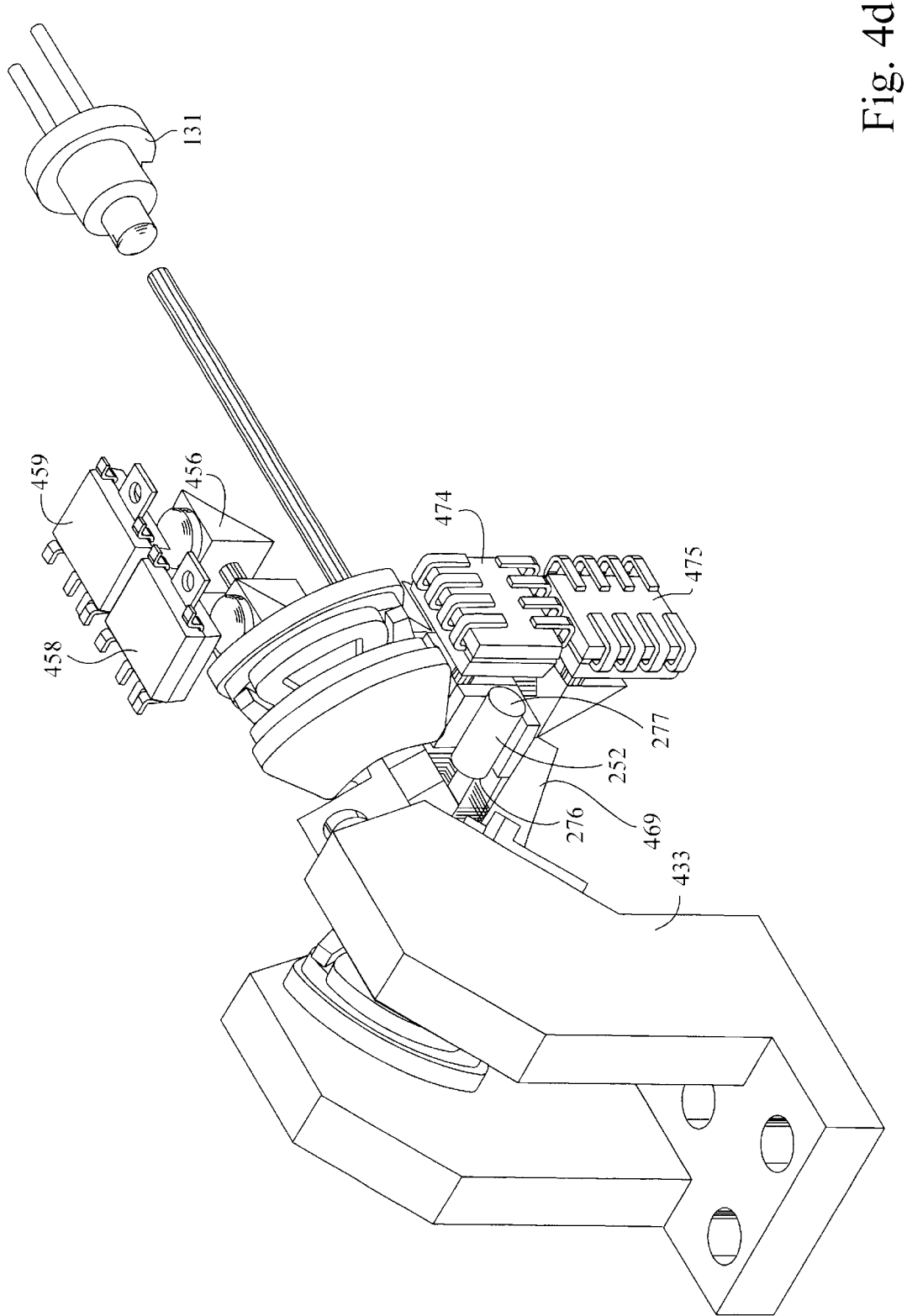

Referring now to FIG. 3a, there is seen the focusing assembly coupled to an optical fiber bundle assembly. In the preferred embodiment, the optical switch 104 further includes an optical fiber bundle assembly 353. The optical fiber bundle assembly 353 comprises a housing 354 and a set of optical fibers 302. In an exemplary embodiment, the housing 354 is a borosilicate glass capillary tube, which has a 1.8 mm outer diameter and a 0.410 mm inner diameter 344. The optical fibers 302 each comprise an outer sheathing 333, which is preferably removed from a proximal end of each fiber 302. In an exemplary embodiment, the unsheathed proximal end of each optical fiber 302 comprises 80 um in diameter. In the exemplary embodiment, the unsheathed ends of the optical fibers 302 are arranged as a closely packed hexagonal structure (as viewed in a cross-section in FIG. 3b), which is centrally disposed within the inner diameter 344 to extend through a front face 378 of the housing 354. The unsheathed proximal ends of the optical fibers 302 and the front face 378 of the housing 354 are subsequently polished as a unit to provide a planar surface for subsequent coupling of the optical fiber bundle assembly 353 to a back surface 277 (FIGS. 2a–b) of the focusing assembly 252. The polarization axes of all the optical fibers 302 are aligned relative to one another, and the unsheathed proximal ends of the optical fibers 302 are secured within the inner diameter 344 of the housing 354 using low shrinkage epoxy. Other dimensions and other geometries for the housing 354 and the optical fibers 302 are within the scope of the invention, for example, as shown in FIG. 3c. In the exemplary embodiment, the set of optical fibers 302 comprises a set of 19 single-mode polarization maintaining (SMPM) optical fibers. In the preferred embodiment, the minimum number of optical fibers 302 is a function of the number of desired output ports 182, wherein the number of optical fibers (M) is greater than or equal to the number of output ports (N).

In the preferred embodiment, the focusing assembly 252 comprises a GRIN lens, which in an exemplary embodiment is a 1.8 mm diameter, quarter-pitch, piano-piano GRIN lens (model SLW-1.8) rod manufactured by NSG America Inc., Somerset N.J. The GRIN lens of the present invention utilizes a radial index of refraction. The index of refraction is highest in the center of the lens and decreases with radial distance from its longitudinal axis. The following equation describes the refractive index distribution of the GRIN lens of the present invention $N(r)=N_0(1-(A/2)(r^2))$. The equation illustrates that the index falls quadratically as a function of a radial (r) distance of the lens. The resulting parabolic index distribution has a steepness that is a function of the value of the gradient index constant SQRT(A) and is a characterization of the lens' optical performance. In a GRIN lens, optical rays follow a sinusoidal path until reaching a back surface. A light ray that has traversed one pitch (P) traverses one cycle of the sinusoidal wave that characterizes a particular lens. The pitch (P) is the spatial frequency of the ray trajectory. The following equation relates the pitch (P) to the mechanical length (L) and the gradient index constant SQRT(A), $2\pi P=SQRT(A)(L)$. For appropriate values of the pitch, a focused spot may be formed on the back surface of the GRIN lens. The present invention identifies that a change in the angular orientation of the outgoing laser beam 191 relative to a central optical axis 280 of the focusing assembly 252 (i.e., GRIN lens) results in translation of the laser beam 191 at an exit point along the back surface 277 of the focusing assembly 252 (i.e., GRIN lens). In an exemplary embodiment, a change of 3 degrees in angular orientation of the outgoing laser beam 191 results in 0.187 mm linear translation of the focused outgoing laser beam 191 along the back surface 277. For each of N unique angular orientations of the actuator assembly 251, the outgoing laser beam 191 exits the back surface 277 of the focusing assembly 252 at a point corresponding to one of the N output ports 182. The present invention provides the ability to place a large number of output ports 182 as a very closely packed structure with minimal spacing between the output ports and, therefore to provide a minimal distance between the output ports 182 such that switching of the outgoing laser beam 191 between the output ports may be effectuated with a reduced speed. In an exemplary embodiment a maximal switching speed between any two output ports 182 is less than 1 ms. In the present invention a closely packed structure of the output ports 182 also makes possible an optical switch 104 in a reduced volumetric. Use of a focusing assembly 252 comprising a single optical element (i.e., GRIN lens) also simplifies the design, alignment, and manufacturing of the focusing assembly 252. It is understood that the present invention should not be limited by the aforementioned lens design as other designs for the focusing assembly 252 fall within the scope of the invention, albeit with an introduction in increased design complexity.

Referring now to FIGS. 4a–4d, there is seen the actuator assembly in further detail. In the preferred embodiment, the actuator assembly includes a first actuator 433 and a second actuator 434. In an exemplary embodiment the first 433 and second 434 actuators comprise voice coil motor assemblies (VCMs). In the preferred embodiment, the actuator assembly 251 is disposed in an optical path between the laser source 131 and the focusing assembly 252 (visible in FIG. 4d, wherein only the VCM 434 is shown). The actuator assembly 251 includes: a first right angle reflector 455, a second right angle reflector 456, a leaky-beam splitter 450, a polarizing beam splitter 479, and a set of polarization detectors 458 and 459. A quarter-wave plate (not shown) is disposed between the polarizing beam splitter 479 and the leaky-beam splitter 450. In the preferred embodiment, the laser source 131 directs the outgoing laser beam 191 towards the leaky-beam splitter 450. A portion of the outgoing laser beam 191 is directed by the leaky-beam splitter 450 towards a first mirror 451a and is directed by the first mirror 451a towards a second mirror 451b. In an exemplary embodiment, approximately 92% of the outgoing laser beam 191 is directed by the leaky-beam splitter 450 towards the first mirror 451a and is reflected by the first mirror 451a towards the second mirror 451b. A remaining portion of the outgoing laser beam 191 (hereinafter referenced as laser beam 191a) is directed by the leaky-beam splitter 450 towards the first right angle reflector 455, by the right angle reflector 455 towards the first mirror 451a, and by the first mirror 451a towards the second mirror 451b. The first mirror 451a and the second mirror 451b are coupled to respective VCMs 433 and 434 by displaceable arms 469 and 470 located therebetween. In the preferred embodiment, the first and second mirrors 451a and 451b are positioned by the arms 469 and 470 about respective axes 254a and 254b such that the laser beam 191 is displaced by a unique angular orientation towards a central point (to a first order approximation) on the front surface 276 (FIG. 3a) of the focusing assembly 252.

Figure 2C:
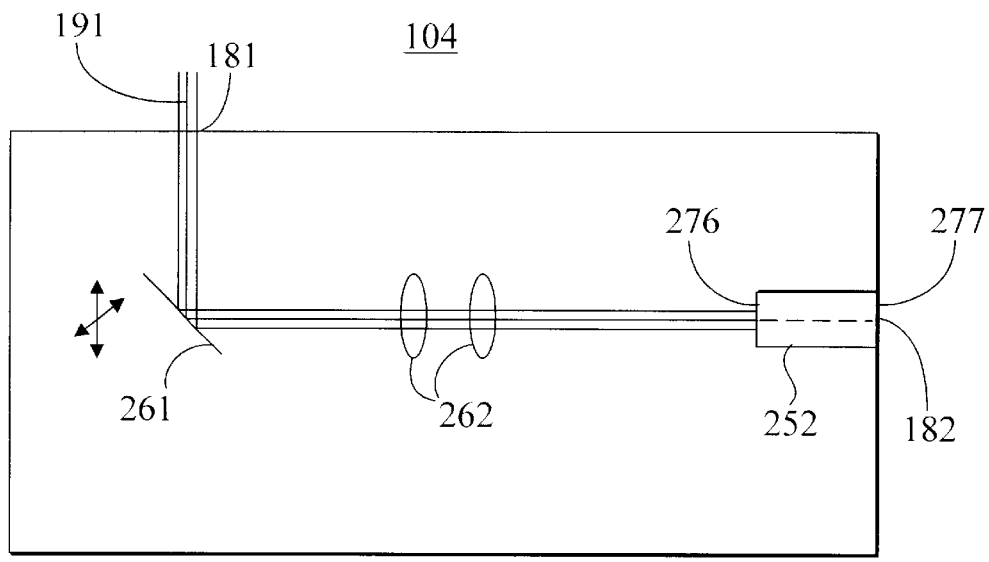
FIG. 2c and FIG. 2d are alternative embodiments showing the outgoing laser beam displaced by an actuator assembly.
Figure 2D:
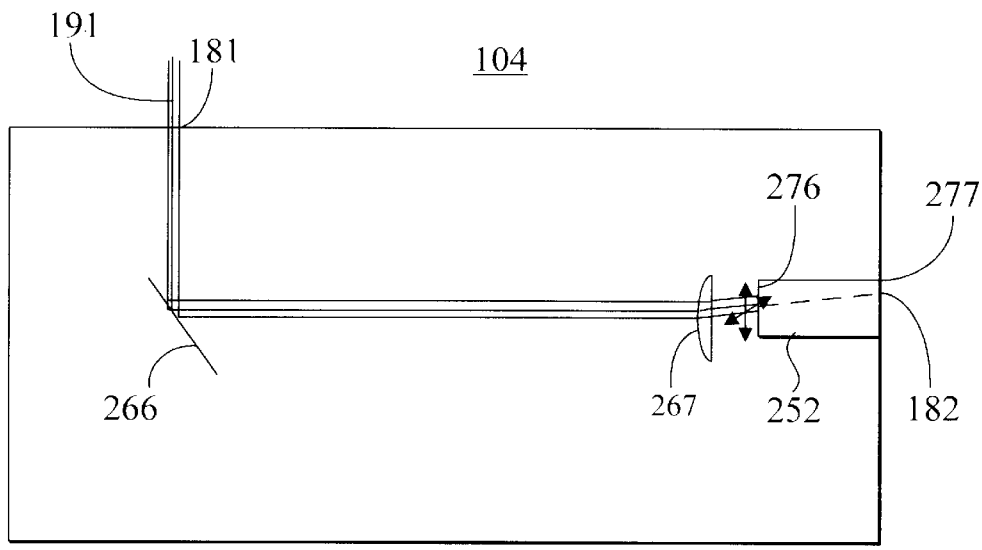

As described in further detail below, the unique angular orientation defines through which of the particular optical fibers 302 convey the laser beam 191 towards a destination, or vice versa. Although in the preferred embodiment the optical path traversed by the outgoing laser beam 191 is altered by the actuator assembly 251 that comprises VCMs 433 and 434, it is understood that alternative actuator assembly 251 designs for altering the optical path of the outgoing laser beam 191 are feasible. For example, in a first alternative embodiment shown in FIG. 2c, an optical path traversed by the outgoing laser beam 191 may be redirected by a reflector 261 that is movable in two dimensions wherein the reflector 261 directs the outgoing laser beam 191 towards the focusing assembly 252 through a fixed imaging optics 262. In a second alternative embodiment shown in FIG. 2d, an optical path of the outgoing laser beam 191 may be directed directly or by a fixed reflector 266 towards an optical element 267 that is movable in two dimensions and by the optical element 267 towards the focusing assembly 252.

Figure 5:
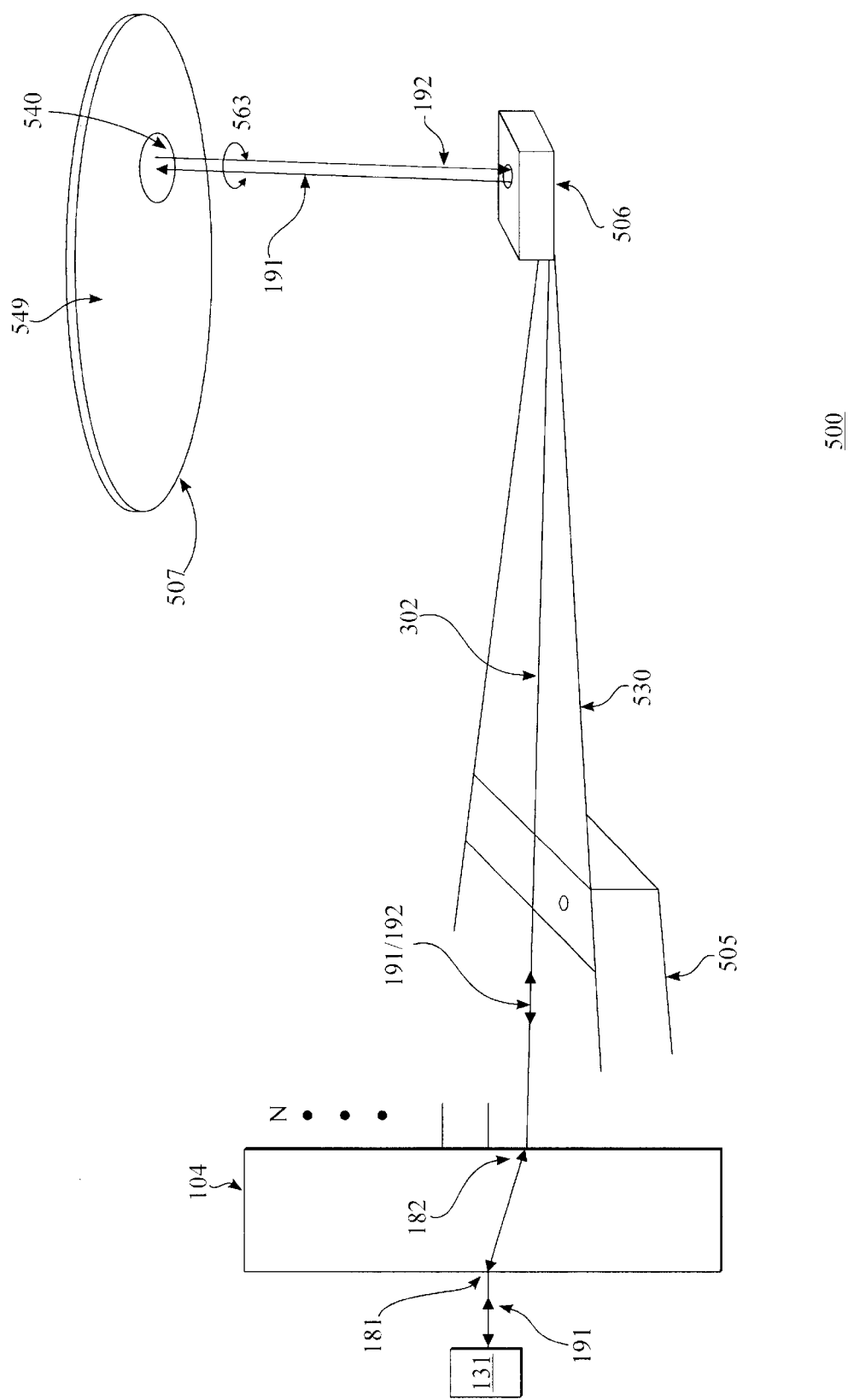
FIG. 5 illustrates an optical switch as used in a magneto-optical (MO) data storage and retrieval system.

Referring now to FIG. 5, there is seen the optical switch as used in a magneto-optical (MO) data storage and retrieval system. In an exemplary embodiment, a magneto-optical (MO) data storage and retrieval system 500 includes a set of Winchester-type flying heads 506 that are adapted for use with a set of double-sided first surface MO disks 507 (one flying head for each MO disk surface). The set of flying heads 506 are coupled to a rotary actuator magnet and coil assembly (not shown) by a respective suspension 530 and actuator arm 505 so as to be positioned over the surfaces of the set of MO disks 507 (only one shown). In operation, the set of MO disks 507 are rotated so as to generate aerodynamic lift forces and to maintain the set of flying MO heads 506 in a flying condition approximately 15 micro-inches above the upper and lower surfaces of the set of MO disks 507. The lift forces are opposed by equal and opposite spring forces applied by the set of suspensions 530. During non-operation, the set of flying MO heads 506 are maintained statically in a storage condition away from the surfaces of the set of MO disks 507. System 500 further includes: the laser source 131, the optical switch 104, and the set of optical fibers 302. In the preferred embodiment, light is directed by the optical fibers 302 along a respective one of the set of actuator arms 505 and set of suspensions 530 to a respective one of the set of flying MO heads 506.

In an exemplary embodiment, the laser source 131 operates at a single wavelength, preferably at 635–685 nm within a red region of the visible light spectrum; however, it is understood that laser sources operating at other wavelengths may be used. In the preferred embodiment, the laser source 131 is a distributed feedback (DFB) diode laser source. A DFB laser source 131, unlike an RF-modulated Fabry-Perot diode laser, produces a very narrowband single frequency output due to the use of a wavelength selective grating element inside the laser cavity. Linearly polarized light from a DFB laser source 131 that is launched into one of the single-mode polarization maintaining optical fibers 302 exits the optical fiber with a polarization state that depends on the relative orientation between the fiber axes and the incident polarization. The output polarization state is very stable in time as long as external perturbations which alter the fiber birefringence are negligible. This behavior contrasts to that observed when using prior art RF-modulated Fabry-Perot diode laser sources. Fabry-Perot laser diodes are characterized by high-frequency fluctuations in their spectral output; therefore, when linearly polarized light is launched into one of the polarization maintaining optical fibers 302, fluctuations in the laser wavelength lead to corresponding polarization fluctuations in the laser light exiting the output of the optical fiber. The resulting polarization noise is larger than the corresponding DFB diode laser source case owing to wavelength-dependent mode coupling and dispersion of the phase difference between orthogonal polarization modes. Mode coupling in polarization maintaining optical fibers is a phenomenon whereby a small portion of the light that is being guided along one polarization axis is coupled into the orthogonal axis by intrinsic or stress-induced defects. In MO recording it is important that the polarization noise be kept to a minimum such that a signal to noise ratio (SNR) in the range of 20–25 dB can be achieved. By using a DFB laser source 131 it is possible to achieve the aforementioned level of SNR in the magneto-optical (MO) data storage and retrieval system 500 when utilizing polarization maintaining optical fibers for the delivery and return of the signal light to and from the MO disks 507.

Referring back to FIG. 5, the optical switch 104 directs the laser beam 191 to selectively exit one of the N output ports 182 and as described below in further detail, to enter a respective proximal end of one of the set of M optical fibers 302. The linearly polarized outgoing laser beam 191 is preferably aligned in the optical path so as to enter the proximal end of a particular single-mode polarization maintaining optical fiber 302 at a 45 degree angle relative to the polarization axis of the optical fiber 302. The outgoing laser beam 191 is directed by the optical fiber 302 to exit a respective distal end. As used in the system 500, the outgoing laser beam 191 is further directed by optical elements disclosed on the head 506 towards a surface recording layer 549 of a respective MO disk 507.

During writing of information, the outgoing laser beam 191 is selectively routed by the optical switch 104 towards a particular MO disk 507 to lower a coercivity of the surface recording layer 549 by heating a selected spot of interest 540 to approximately the Curie point of the MO recording layer 549. Preferably, the optical intensity of outgoing laser beam 191 is held constant at a power on a range of 30–40 mw, while a time varying vertical bias magnetic field is used to define a pattern of "up" or "down" magnetic domains perpendicular to the MO disk 507. This technique is known as magnetic field modulation (MFM). Alternatively, outgoing laser beam 191 may be modulated in synchronization with the time varying vertical bias magnetic field at the spot of interest 540 in order to better control domain wall locations and reduce domain edge jitter. Subsequently, as the selected spot of interest 540 cools at the surface layer 549, information is encoded at the surface of the respective spinning disk 507.

During readout of information, the outgoing laser beam 191 (at a lower power compared to writing) is selectively routed to the MO disk 507 such that at any given spot of interest 540 the Kerr effect causes a reflected laser beam 192 (a reflection of the outgoing laser beam 191 from the surface layer 549) to have a rotated polarization of either clockwise or counter clockwise sense 563 that depends on the magnetic domain polarity at the spot of interest 540. The aforementioned optical path is bidirectional in nature; accordingly, the reflected laser beam 192 is received by the optical elements located on the flying MO head 506 and is directed by the optical elements towards the distal end of the optical fiber 302.

Referring back to FIGS. 4a–4d, the reflected laser beam 192 propagates along the optical fiber 302 and is directed towards the back surface 277 of the focusing assembly 252. The reflected laser beam 192 exits the front surface of the focusing assembly 252 and is reflected by the second mirror 451b and the first mirror 451a towards the leaky beam splitter 450. The reflected laser beam 192 is routed by the leaky beam splitter 450 through the quarter-wave plate (not shown) towards the polarizing beam splitter 479. A portion of the reflected laser beam is directed towards the polarization detector 458 and a remaining portion is directed by the second right angle reflector 456 towards the polarization detector 459. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO disks 507. After conversion by the set of polarization detectors 458 and 459, the differential signal is processed by a differential amplifier (not shown) for output as a representation of encoded information stored on the MO disks 507. The optical switch 104 further comprises: a beam splitter 473, a third right angle reflector 471, a first position sensing detector (PSD) 474, and a second position sensing detector (PSD) 475. In the preferred embodiment the PSDs 474 and 475 are 3 mm×3 mm one dimensional PSDs manufactured by Hamamatsu Corp., Bridgeport N.J. Each position sensing detector 474 and 475 comprises a measuring surface of sufficient dimension to provide an output signal over the desired range of motion of the laser beam 191a. In the preferred embodiment, the laser beam 191a is reflected by the first right angle reflector 455 and subsequently by the first and second mirrors 451a and 451b towards the beam splitter 473. The beam splitter 473 directs a portion of the laser beam 191a towards the measuring surface of the first position sensing detector 474. The remaining portion of the laser beam 191a is directed by the beam splitter 473 towards the third right angle reflector 471 and (by the third right angle reflector 471) towards the measuring surface of the second position sensing detector 475.

Figure 6A:
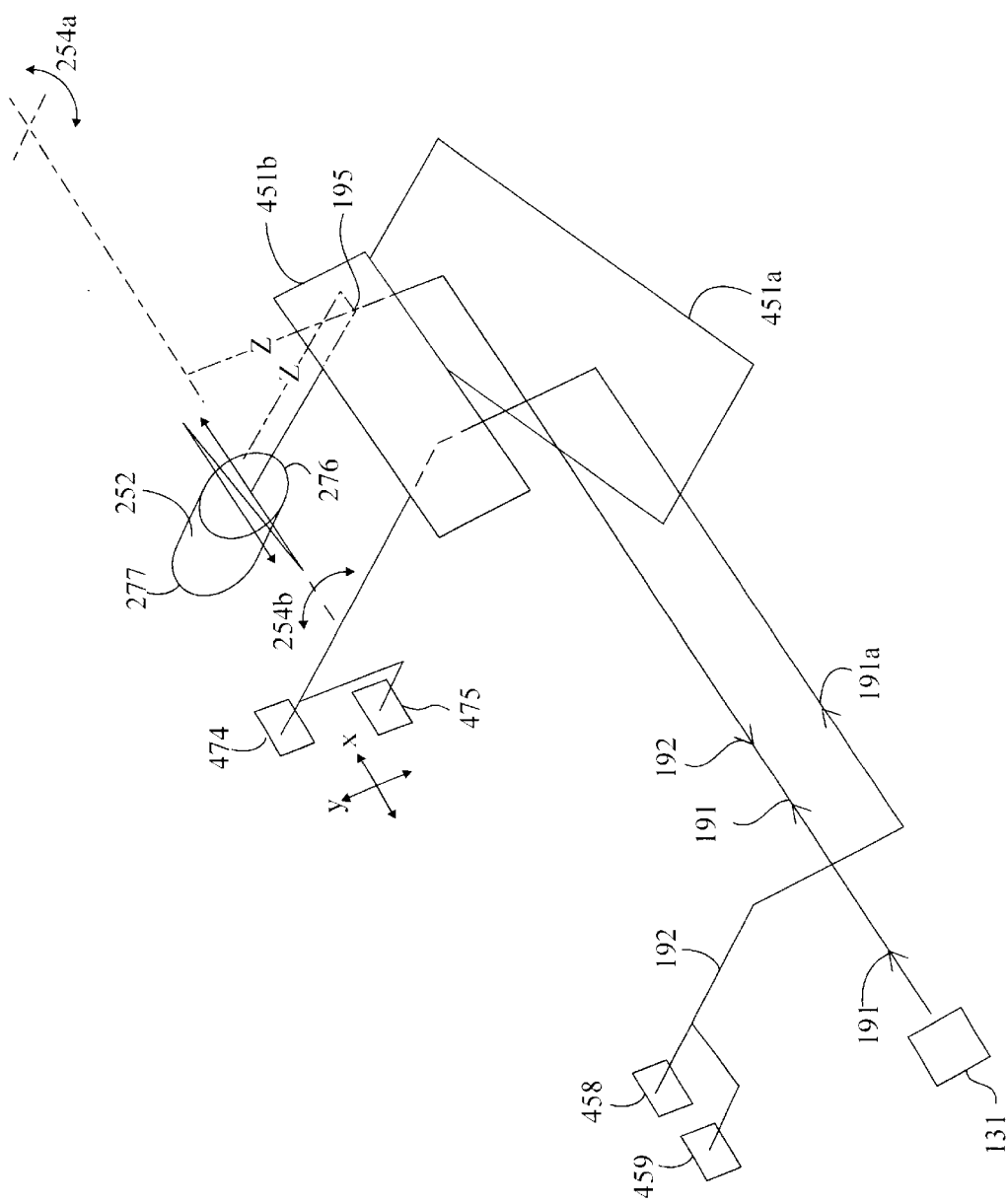
FIG. 6a illustrates the optical paths traversed by laser beams 191, 191a, 192 of the present invention.
Figure 6B:
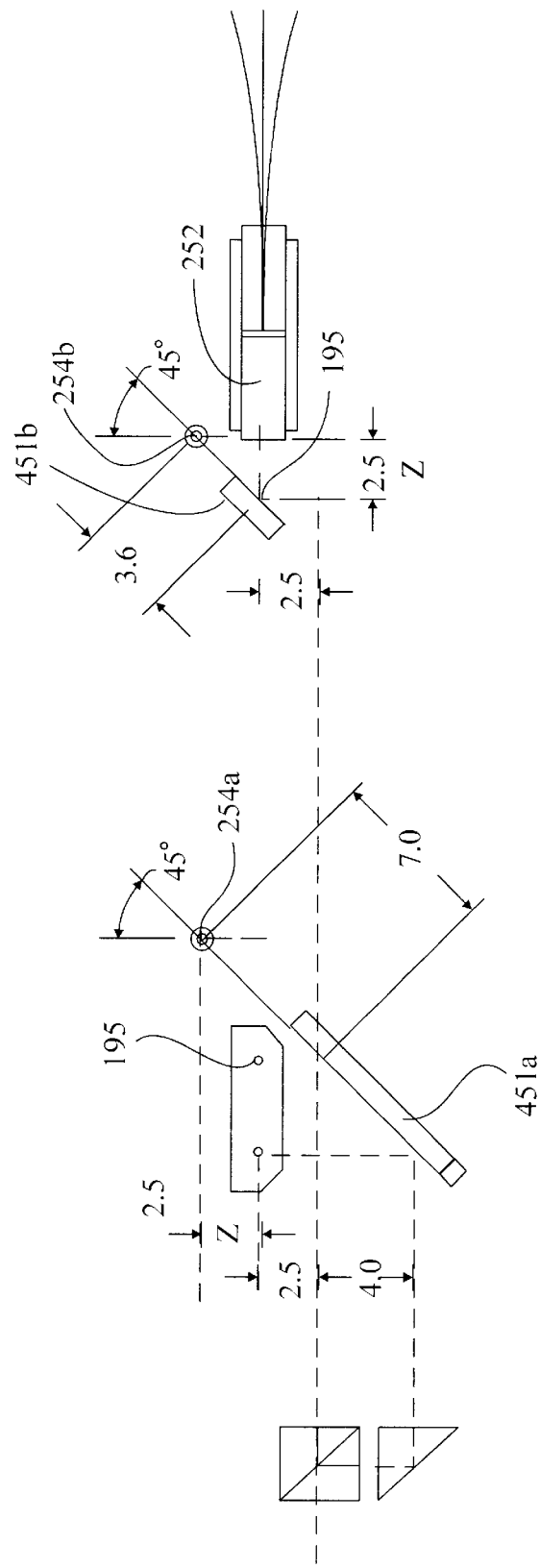
FIG. 6b illustrates the dimension Z in further detail.

Referring now to FIG. 6a, the optical paths traversed by the laser beams 191, 191a, and 192 are shown. In the preferred embodiment, the axis 254b falls along a vertical plane approximately coextensive with the front surface 276 of the focusing assembly 252, and the axis 254a falls along a horizontal plane passing a vertical distance Z above the point of reflection of the outgoing laser beam 191 from the second mirror 451b; the vertical distance Z being defined by approximately the distance from the reflection point of the outgoing laser beam 191 from the second mirror 451b to the front surface of the focusing assembly 252 (also illustrated in FIG. 6b). As shown in FIG. 6a, the displacements experienced by the outgoing laser beam 191 and the laser beam 191a resulting from displacement of the first mirror 451a and/or the second mirror 451b are generally the same. In the preferred embodiment, the measurement surface of the first position sensing detector 474 is disposed to detect displacement of the laser beam 191a that results from the angular movement of the arm holding second mirror 451b, and the measurement surface of the second position sensing detector 475 is disposed to detect displacement of the laser beam 191a that results from the angular movement of the arm holding the first mirror 451a. The first and second position sensing detectors 474 and 475 each provide a signal that may be used to represent the angular position of the outgoing laser beam 191 as a set of coordinates in two dimensional free space. The signal provided by the first detector 474 may represent a X coordinate, and the signal provided by the second detector 475 may represent a Y coordinate. The two dimensional displacements experienced by the laser beams 191 and 191a are generally the same, thus, the X-Y coordinates measured by the first detector 474 and the second detector 475 preferably correlate to the two dimensional angular orientation of the laser beam 191 incident on the front surface 276 of the focusing assembly 252. Because each unique angular orientation of the outgoing laser beam 191 corresponds to a displacement of the focused laser beam 191 across the back surface 277, the X-Y coordinates that correspond to the displacement of the laser beam 191a across the measurement surfaces of the first and second position sensing detectors 474 and 475 may be used to selectively direct the outgoing laser beam 191 towards a particular exit point along the back surface 277 of the focusing assembly 252 and, consequently, towards a particular one of the N output ports 182. In an exemplary embodiment of operation, the first and second mirrors 451a and 451b are rotated by respective VCMs about axes 254a and 254b to scan the focused laser beam 191 progressively from top to bottom across the back surface 277 of the focusing assembly 252. Signals from the first and second polarization detectors 458 and 459 are summed and are monitored by detection circuitry (not shown) for a first peak indication in the reflected laser beam 192. The first peak indication preferably corresponds to an alignment of the laser beam 191 onto a core of a first of the M optical fibers 302. In the exemplary embodiment, the X-Y coordinate corresponding to the first peak indication is stored in a calibration look-up table. The alignment process is repeated in a similar manner until peak indications are measured and corresponding X-Y coordinates are stored in the look-up table for the remaining N of the M optical fibers 302. Accordingly, the laser beam 191 may be selectively directed towards any one of the optical fibers 302 by displacing the laser beam 191a until an X-Y signal corresponding to an particular output port 182 is detected at the outputs of the first and second position sensing detectors 474 and 475. In the preferred embodiment, the PSDs 474 and 475 resolve movement of the laser beam 191a across respective measurement surfaces such that the laser beam 191 may be directed with sufficient accuracy towards a particular one of the optical fibers 302.

The calibration table may be updated on a periodic basis, for example, when relative alignments of the components comprising the optical switch 104 are altered by changes in temperature. In rapidly changing environments, for example environments subject or shock or vibration, the optical positioning of the laser beam 191 onto a core of a particular fiber 302 may be maintained using closed loop servo techniques that are well known in the art. Because in the exemplary embodiment M equals 19 and N equals 12, those skilled in the art will recognize that not all of the optical fibers 302 are necessarily used. In those embodiments where M is greater than N, any one of the unused M-N optical fibers 302 may be used in place of any one of the N optical fibers 302, for example, when one of the N optical fibers 302 is found to defective.

In the preferred embodiment, the PSDs 474 and 475 may also be used to provide a signal that is proportional to the intensity of the laser source 131, which may be used as a feedback signal for control of the intensity of the laser source 131.

Referring now to FIG. 7a, an embodiment of a magneto-optical disk drive is illustrated. In an exemplary embodiment, the magneto-optical (MO) data storage and retrieval system 500 comprises an industry standard 5.25 inch half-height form factor (1.625 inch) within which are disposed at least six double-sided first surface MO disks 507 and at least twelve flying MO heads 506. The twelve flying MO heads 506 each include a respective optical fiber 302 as part of a very small mass and low profile high NA optical system. Use of optical fibers permits utilization of multiple MO disks 507 at a very close spacing within the system 500 and, therefore, to comprise a higher areal and volumetric and storage capacity than is permitted in an equivalent volume of the prior art. In the preferred embodiment, a spacing between each of the at least six MO disks 507 is reduced to at least 0.182 inches and high speed optical switching of light between the laser source 131 and the MO disks 507 is provided by the optical switch 104.

In an alternative embodiment shown in FIG. 7b, the system 500 may include a removable MO disk cartridge portion 710 and two fixed internal MO disks 507. By providing the removable MO disk cartridge portion 710, the fixed internal and removable combination permits external information to be efficiently delivered to the system 500 for subsequent transfer to the internal MO disks 507. The copied information may subsequently be recorded back onto the removable MO disk cartridge portion 710 for distribution to other computer systems. In addition, the removable MO disk cartridge portion 710 allows for very convenient and high speed back-up storage of the internal MO spinning disks 507. The fixed internal and removable combination also permits storage of data files on the removable MO disk cartridge portion 710 and system files and software applications on the internal MO spinning disks 507. In another alternative embodiment (not shown), system 500 may include any number (including zero) of internal MO disks 507 and/or any number of MO disks 507 within any number of removable MO disk cartridge portions 710.

The low profile optical paths disclosed by the present invention may be used to convey information to and from a storage location without requiring objective optics on the MO head 506 (e.g., using a tapered optical fiber or an optical fiber with a lens formed on an end); and/or reflective substrates (e.g., using a curved optical fiber to convey information along surfaces of the magneto-optical head 506). The optical switch 104 described herein may also be used in many different environments and in many different embodiments, for example: in other form factors (e.g., full height), with other optical sources of light (e.g., Fabrey-Perot laser diodes), with other optical fibers (e.g., non-polarization maintaining optical fibers), and/or with other types of optical elements. The present invention is also applicable to transfer of information using other storage and retrieval technologies, for example, compact disks (CD) and digital video disks (DVD). The present invention may be also used for optical switching of light in optical communications systems.

Therefore, although the present invention has been described herein with reference to particular embodiments, a latitude of modification, various changes, and substitutions are intended in the foregoing disclosure. It will be appreciated that in some instances some features of the invention may be employed without a corresponding use of other features without departure from the scope of the invention as set forth.

What is claimed is:

1. An apparatus for directing a beam of light along an optical path between an input and an output, comprising an optical element disposed in said optical path and having a front surface and a back surface and an optical axis extending between said front surface and said back surface, a reflector assembly disposed in said optical path, said reflector assembly having a reflector that is movable in two dimensions to selectively direct said beam of light with a selected angular orientation relative to said optical axis that is chosen from a plurality of angular orientations, said optical element directing said beam of light from said front surface to said back surface, said back surface including a plurality of output locations that correspond respectively to said plurality of angular orientations.

2. The apparatus as recited in claim 1, further comprising a plurality of optical fibers, wherein said plurality of optical fibers each have a proximal end and a distal end, wherein said proximal ends of said plurality of optical fibers are aligned in said optical path with said plurality of output locations.

3. The apparatus as recited in claim 2, wherein said proximal ends are disposed within a housing.

4. The apparatus as recited in claim 3, wherein said proximal ends are disposed in a closely packed pattern.

5. The apparatus as recited in claim 1, wherein said optical element is a GRIN lens.

6. The apparatus as recited in claim 1, further comprising a reflector and a detector, a beam splitter disposed in said optical path for diverting a portion of said beam of light to said reflector, said reflector directing the portion of said beam of light to said reflector assembly and said reflector assembly directing the portion of said beam of light to said detector for determining an optical position of the portion of said beam of light, said reflector assembly being coupled to said detector to selectively direct said beam of light in response to said optical position of the portion of said beam of light.

7. The apparatus as recited in claim 1, wherein said reflector assembly includes at least one reflector and at least one actuator coupled to said at least one reflector.

8. The apparatus as recited in claim 7, wherein said at least one actuator includes a voice coil motor.

9. An apparatus for directing a beam of light along an optical path between an input and an output comprising an optical element disposed in said optical path and having a front surface and a back surface and an optical axis extending between said front surface and said back surface, an actuator assembly disposed in said optical path and configured to selectively direct said beam of light with a selected angular orientation relative to said optical axis that is chosen from a plurality of angular orientations, said optical element directing said beam of light from said front surface to said back surface, said back surface including a plurality of output locations that correspond respectively to said plurality of angular orientations, said actuator assembly including a first actuator and a second actuator, said first actuator having a first arm rotatable about a first rotation axis and a first reflector coupled to said first arm configured to reflect said beam of light at a first reflection point, said second actuator having a second arm rotatable about a second rotation axis and a second reflector coupled to said second arm configured to reflect said beam of light at a second reflection point.

10. The apparatus as recited in claim 9, wherein said first actuator and said second actuator each include a voice coil motor.

11. The apparatus as recited in claim 9, wherein said first rotation axis intersects said second rotation axis.

12. The apparatus as recited in claim 11, wherein said second reflection point is disposed along said optical path between said first reflection point and said optical element.

13. The apparatus as recited in claim 9, further comprising a detector and a beam splitter disposed in said optical path for diverting a portion of said beam of light to an alternate path to said detector to determine an optical position of the portion of said beam of light, said actuator assembly being coupled to said detector to selectively direct said beam of light in response to said optical position of the portion of said beam of light.

14. The apparatus as recited in claim 13, further comprising a reflector for directing the portion of said beam of light from the beam splitter to said first reflector, said first reflector directing the portion of said beam of light to said second reflector and said second reflector directing the portion of said beam of light to said detector.

15. An optical disk drive comprising a storage disk, an optical source for providing a beam of light that extends along an optical path to the storage disk, an optical element disposed in said optical path and having a front surface and a back surface and an optical axis extending between said front surface and said back surface, a reflector assembly disposed in said optical path for selectively directing said beam of light with a selected angular orientation relative to said optical axis that is chosen from a plurality of angular orientations, said reflector assembly including a first reflector rotatable about a first rotation axis and a second reflector rotatable about a second rotation axis that intersects said first rotation axis, said optical element directing said beam of light from said front surface to said back surface, said back surface including a plurality of output locations that correspond respectively to said plurality of angular orientations.

16. The optical disk drive as recited in claim 15, further comprising a plurality of optical fibers, wherein said plurality of optical fibers each have a proximal end and a distal end, wherein said proximal ends of said plurality of optical fibers are aligned in said optical path with said plurality of output locations.

17. The optical disk drive as recited in claim 16, wherein said proximal ends are disposed within a housing.

18. The optical disk drive as recited in claim 16, wherein said proximal ends are disposed in a closely packed pattern.

19. The optical disk drive as recited in claim 16, wherein said storage disk includes an optical storage location, wherein said distal ends are disposed to direct said beam of light between said distal ends and said optical storage location.

20. The optical disk drive as recited in claim 15, wherein said optical element is a GRIN lens.

21. A method of directing a beam of light with a reflector assembly having a first reflector rotatable about a first rotation axis and a second reflector rotatable about a second rotation axis that intersects said first rotation axis to an optical element having an optical axis, comprising the step of selectively directing said beam of light with the reflector assembly to the optical element with a selected angular orientation relative to the optical axis of said optical element so that said beam of light exits said optical element at an output location corresponding to said selected angular orientation.

22. The method as recited in claim 21, further comprising the steps of diverting a portion of said beam of light to a detector, sensing a position of the portion of said beam of light and adjusting the direction of said beam of light based on said position of the portion of said beam of light.

23. An apparatus for use with a beam of light, comprising an optical element and a reflector assembly for directing said beam of light along an optical path to said optical element, said reflector assembly including a first reflector rotatable about a first rotation axis and a second reflector rotatable about a second rotation axis that intersects said first rotation axis.

24. The apparatus as recited in claim 23, wherein said optical element has a front surface and a back surface and an optical axis disposed between said front surface and said back surface whereby said reflector assembly directs said beam of light to said optical element at a selected angular orientation relative to said optical axis.

25. The apparatus as recited in claim 24, wherein said optical element is a GRIN lens.

26. The apparatus as recited in claim 25, further comprising a plurality of optical fibers disposed adjacent the back surface of said optical element.

* * * * *